United States Patent

[15] 3,636,347

Poot

[45] Jan. 18, 1972

[54] GONIOMETRIC APPARATUS FOR AN X-RAY DIFFRACTOMETER

[72] Inventor: Simon Poot, Pijnacker, Netherlands

[73] Assignee: N.V. Verenigde Instrumentenfabrieken, Enraf-Nonius, Netherlands

[22] Filed: Dec. 8, 1969

[21] Appl. No.: 882,820

[30] Foreign Application Priority Data

Dec. 10, 1968 Netherlands..........................6817709

[52] U.S. Cl. .......................................................250/51.5
[51] Int. Cl. ........................................................G01n 23/20
[58] Field of Search...............................................250/51.5

[56] References Cited

UNITED STATES PATENTS 3,105,901  10/1963  Ladell et al. ..........................250/51.5
3,189,741  6/1965   Patser...................................250/51.5
3,345,613  10/1967  Bucholtz et al. ...................250/51.5 X

*Primary Examiner*—William F. Lindquist
*Attorney*—Waters, Roditi, Schwartz & Nissen

[57] ABSTRACT

A goniostat for a diffractometer or an instrument of similar type which goniostat is rotatable about a first axis, the omega axis, and comprises a goniometer head rotatable about its central axis, the phi axis, which intersects the omega axis in the center of the instrument. The goniometer head is supported on one end of a supporting arm, which at its other end is mounted in the goniostat for rotation about a third axis, the kappa axis, which likewise intersects the omega and phi axes in the center of the instrument. The angles enclosed between the kappa axis and the omega axis and between the kappa axis and the phi axis, respectively, are equal and are in the range of $45°-60°<\frac{2}{3}$.

12 Claims, 5 Drawing Figures

GONIOMETRIC APPARATUS FOR AN X-RAY DIFFRACTOMETER

BACKGROUND OF THE INVENTION

The invention generally relates to goniometric apparatus, and in particular to such apparatus for use in diffractometers or instruments of similar type.

For performing diffraction measurements of an object, such as a single crystal, an X-ray diffractometer may be used. In an instrument of this type the object to be measured is irradiated by a collimated beam of X-rays and the rays reflected by the object are measured by a detector with associated electronic equipment. Many studies require not only a rotation of the detector but also rotational movements of the object about three distinct axes by means of a suitable goniometric apparatus

BRIEF DESCRIPTION OF THE DRAWINGS

The novel arrangement according to the present invention and the advantages thereof will appear more fully from the following description in conjunction with the accompanying drawings which illustrate by way of example an embodiment of an X-ray diffractometer comprising a goniometric apparatus according to the invention.

In the drawings.

FIELD OF THE INVENTION

Figure 1:
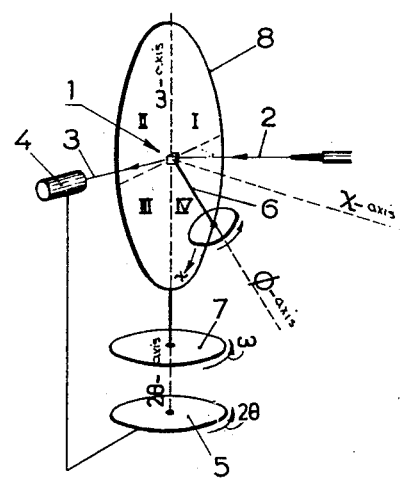
FIG. 1 is a schematic diagram illustrative of the principles of the present invention.

In FIG. 1 of the accompanying drawings these rotational movements have been schematically indicated. A crystal 1 is positioned in the center of the instrument and is irradiated by the above-mentioned collimated beam of X-rays 2, the rays 3 reflected in the crystal being received by a detector 4. Detector, crystal and X-ray collimator are generally arranged in a single plane and the detector is supported by a rotatably mounted supporting member 5 whereby the detector may be rotated about an axis normal to said plane, generally known as the 2-theta axis. The crystal 1 is mounted in a goniometer head schematically shown at 6 and can likewise be rotated about an axis, called the omega axis, normal to said plane through the detector, crystal and collimator which omega axis thus coincides with the 2-theta axis. The crystal is furthermore rotatable about an axis, called the phi axis, which coincides with the central axis of the goniometer head 6 and also about a further axis, called the chi axis, which is normal to the omega and 2-theta axes and to the phi axis, all the said rotational axes intersecting one another at a single point which should coincide with the center of the crystal. The latter two rotational movements are obtained by means of a goniostat which is supported by a member 7 mounted for rotation about the omega axis, the goniostat being diagrammatically shown in FIG. 1 as an annular member or ring 8 in which the radially directed goniometer head 6 is mounted for rotation through a selected arc about the chi axis.

In order to obtain the greatest possible measuring range the chi movement should be possible through an arc of at least 90°, that is in one of the quadrants I, II, III or IV as indicated in FIG. 1. Increasing the chi movement through two or more quadrants does not lead to an increased measuring range if the omega movement covers 360°. If, however, the omega movement is restricted to an arc of 180°, the chi movement should cover either the quadrants I and II or the quadrants III and IV in order to obtain an equal measuring range. In the conventional goniostats, the chi movement is obtained by providing a full circle supporting ring member, such as the ring member 8 of FIG. 1, or a ring member extending through only part of a circle, the goniometer head carrying the crystal being mounted for rotational movement through a predetermined arc along the inner circumference of this ring member in the manner as above mentioned.

The presence of this goniostat ring member necessarily leads to a restriction of the omega movement since other parts of the instrument, such as the X-ray tube holder, the collimator and the detector, extend inwardly into the path of movement of this ring member. If one defines the angular position omega = 0° as the position of the chi plane of the ring member normal to the incident beam 2, an angular position of the chi plane approximating omega = ±90° is in any case not possible. Positioning the X-ray tube and collimator farther outward is unacceptable for scientific reasons and the use of a supporting ring member of smaller diameter would increase the chances of interception of the beams of rays by the ring member. Furthermore, the required stability and precision of movement of the goniometer head set a lower limit to the width of the supporting ring member whereby the extent of the measuring range is likewise restricted. Obviously, a greater width of the supporting ring structure increases the chance of collisions with the above-mentioned fixed parts of the instrument and of interception of the incident or the reflected rays.

SUMMARY OF THE INVENTION

The invention has for its object the provision of a novel goniometric apparatus of the indicated type which obviates the above-discussed disadvantages and restrictions of the conventional apparatus. A further object of the invention is to provide for a goniometric apparatus of this type which has substantially the maximum possible measuring range, particularly in regard to the omega motion, while allowing the collimator, detector and other instrument parts to extend inwardly close to the crystal mounted in the goniometer head.

According to the invention the goniometer head is supported on one end of a supporting arm which at its opposite end is mounted in the goniostat for rotation about a third axis, the kappa axis, which intersects the omega axis in the same point of intersection as the phi axis and encloses an acute angle with the omega axis.

This third axis, for which the name kappa axis is here introduced, is thus different from the chi axis of the known goniostats in that this kappa axis is not normal to the omega axis. Also, the kappa axis will generally not be normal to the phi axis. Preferably the angle between the kappa axis and the omega axis is equal to the angle between the kappa axis and the phi axis. According to a preferred embodiment these angles are in the range of 45°–60°.

The arrangement according to the invention has the advantage that the supporting ring member of the conventional type of goniostat is dispensed with and that the goniometer head supporting arm used instead thereof will lie almost completely to one side of the plane through the collimator, detector and the crystal whereby the possibility of collisions of this supporting arm and goniometer head with other parts of the instrument and of interception of the incident and reflected rays are reduced to a minimum. Thereby an omega movement of almost 360° and consequently a substantially full measuring range are obtained. In this connection it should be remarked, that, as in all comparable instruments, the goniometer head defines a distinct area of ray interception or "shadow cone" in which no incident rays can reach the crystal and in which no reflected rays can be measured. The axial dimension and the mounting structure at the base of the goniometer heads are internationally standardized so that the apex angle of this shadow cone of the goniometer head is the same for all diffractometers. According to a preferred embodiment of the invention, the end portion of the supporting arm on which the goniometer head is mounted may be so formed that this end portion lies within an imaginary cone having its apex in the common intersection point of said axes and its generating line tangential to the outer circumference of the goniometer head. In that case the above-mentioned shadow cone is not increased by the supporting arm for the goniometer head. Because the cross-sectional dimensions of the collimator for the incident X-ray beam are always small (approximately 5 mm.), the spots where the supporting arm would collide with the collimator are located at or near the surface of the shadow cone whereby this mechanical restriction does not lead to any substantial restriction of the measuring range.

In the apparatus according to the invention the chi movement in which the phi axis rotates in a selected chi plane about the center of the instrument (FIG. 1) may be obtained by a combination of two movements, that is a rotation of the goniometer head supporting arm about the newly introduced kappa axis and a rotation of the goniostat as a whole about the omega axis. A rotation of the supporting arm about the kappa axis obviously has the effect that the goniometer head is moved out of the selected chi plane so that in order to return the goniometer head into this chi plane a correction is required by means of a corresponding omega rotation. Such an adjustment of the goniometer head supporting arm likewise causes a change in the phi angular position of the goniometer head in the chi plane which also requires a correction.

The invention also relates to a process for controlling a goniometric apparatus as above described with the object of carrying out the above-discussed corrections. This process comprises controlling the omega and phi movements in such correlation with the kappa movement that an adjustment of the supporting arm angular position about the kappa axis is accompanied by a simultaneous adjustment of the goniostat angular position about the omega axis and with the goniometer head angular position about the phi axis tending to maintain the phi axis in the same plane and to maintain the goniometer head in the same angular position with respect to this plane, respectively.

The above-mentioned corrections of the omega angular position and the phi angular position are only required if the user of the apparatus wishes to continue using the conventional system of coordinate based on the omega, chi and phi axes of FIG. 1, which however only optional. Although this coordinate system has become generally adopted, there is no objection from a crystallographic point of view to introduce a new system of coordinates based on the omega°, kappa en phi° axes of the novel goniostat according to the invention, in which case it is then possible to dispense with the above-mentioned omega and phi corrections. It is to be noted, however, that the calculation of the four relevant angular positions (two theta, omega, kappa and phi) in which a reflected beam of rays is expected to be caught by the detector is generally carried out by a computer. If desired, the input and the output of the computer can be given in the conventional system of coordinates and by suitably programming the computer the latter may quickly and accurately calculate the corresponding angular positions in the new system of coordinates. It is, furthermore, quite usual to connect the diffractometer directly to the computer in which case the user need not have any knowledge at all of the new system of coordinates.

In converting the new omega°, kappa, phi° coordinate system into the old omega, chi, phi coordinate system, the following relations rare are applicable:

$\sin(x/2) = \sin(K/2) \cdot \sin(\alpha)$
$\cos(x/2) \cos(\Delta) = \cos(K/2)$
$\cos(x/2) \sin(\Delta) = \sin(K/2) \cdot \cos(\alpha)$
$\omega - \Delta = \Delta_o$
$\phi - \Delta = \phi_o$ In which $\alpha$ is the angle between the kappa axis and the omega axis and also the angle between the kappa axis and the phi axis which two angles are, therefore, assumed to be equal. It is to be noted that $K=0$ when the phi axis coincides with the omega axis.

The above-discussed corrections for the omega axis and phi axis appear to be equal and can be expressed by the relation:

$\tan(\Delta) = \tan(K/2) \cdot \cos(\alpha)$.

As above mentioned, the angle $\alpha$ between the kappa axis and the omega axis and between the kappa axis and the phi axis is, for instance, 50° in which case the quadrants III and IV of FIG. 1 are covered (or the quadrants I and II if the kappa axis would slope upwardly and the goniometer head supporting arm would lie above the plane through the beams 2 and 3 of FIG. 1). If these angles are increased, a greater part of the chi plane can be covered but, as has been explained in the foregoing, this does not lead to an increased measuring range.

The apparatus according to the invention has the further advantage that the goniometer head is easily accessible. This facilitates the mounting and adjusting of the crystal in the goniometer head and also facilitates the mounting of a ray interceptor for the nonreflected primary rays, the mounting of a microscope directed on the crystal and the use of auxiliary apparatus such as means for cooling or heating the crystal or other object. To accomplish this latter purpose a central bore which is coaxial with the omega and 2-theta axes may be provided in the supporting members for the detector and for the goniostat through which bore such auxiliary apparatus may be passed through. The structure of the apparatus according to the invention easily allows the provision of such a bore.

PREFERRED EMBODIMENT OF THE INVENTION

Figure 2:
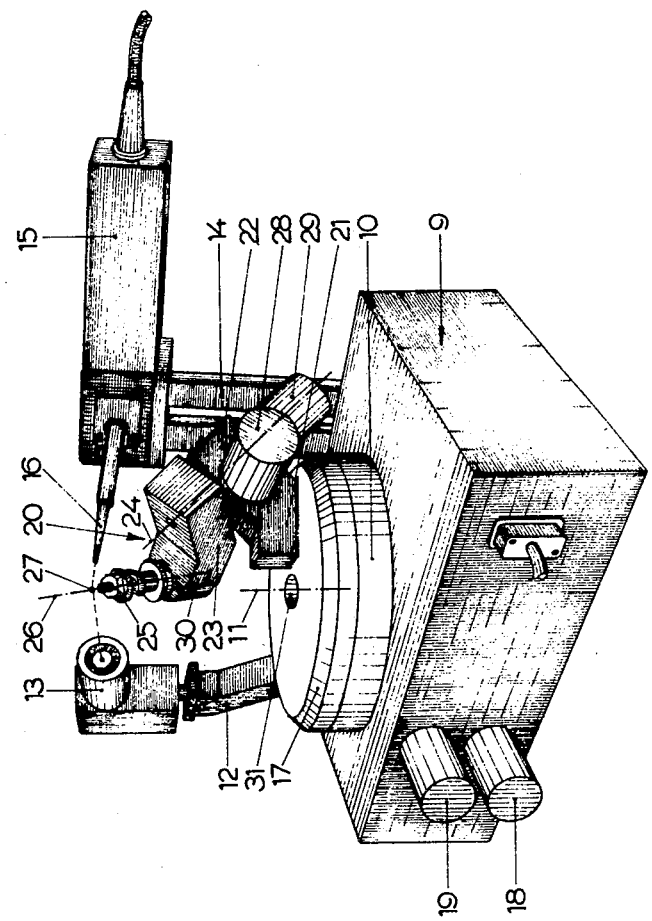
FIG. 2 is a simplified perspective view of a diffractometer incorporating the present invention.

Referring to the drawings, there is shown in FIG. 2 in schematic form the general construction of the diffractometer. The instrument has a housing 9 on which a disc-shaped member 10 is mounted for rotation about an axis 11 forming the 2-theta axis. The disc 10 may be compared to the member 5 of FIG. 1 and supports a detector 13 by means of a bracket 12 which detector may be of conventional type and design in the art of diffractometers and is arranged with its radially directed axis normal to and intersecting the axis 11, as shown. A holder 15 for an X-ray tube is mounted on the housing 9 by means of a support 14 and a collimator 16 for the incident X-ray beam extends from this holder 15 perpendicularly thereto and radially inwardly, the axis of the collimator being normal to the axis 11 and, as shown, intersecting this axis 11 in the same point of intersection as the axis of the detector 13. Above the disc 10 a goniostat supporting disc or omega disc 17 is arranged which is likewise mounted for rotation about the axis 11, this axis thus also constituting the omega axis. The discs 10 and 17 can be driven for rotation independently of one another by a 2-theta motor 18 and an omega motor 19, respectively, which motors are mounted against a sidewall of the housing 9 and are coupled to the discs 10 and 17 by suitable means not shown. The motors 18 and 19 preferably consist of electric step motors. The above-mentioned parts of the device, including the X-ray tube holder 15 and collimator 16, may be of conventional type and design in the art of diffractometers.

A goniostat generally indicated by 20 is mounted eccentrically on the omega supporting disc 17. The goniostat comprises a base member 21 fixedly secured on the disc 17 and having a base portion 22 extending radially outwardly and upwardly at an angle of 45° with the horizontal. A cranked supporting arm 23 is mounted at one end on the base portion 22 for rotation about an axis 24, to be called the kappa axis, which axis 24 intersects the axis 11 at an angle of 45° in the above-mentioned common point of intersection of this axis 11 with the axes of the detector 13 and the collimator 16. At its free end the arm 23 supports a goniometer head 25 which is so mounted on this arm 23 that its central axis 26, the phi axis, extends at an angle of 45° with the kappa axis 24 and again passes through the above-mentioned common point of intersection on the axis 11. This common point of intersection of the axes 11, 24 and 26 forms the center of the apparatus and a crystal 27 mounted in the goniometer head 25 is arranged in this apparatus. The goniometer head is mounted on the free end of the cranked supporting arm 23 for rotation about the phi axis 26. The goniometer head 25 may be of standard design and standard dimensions and is, therefore, not shown and described in further detail.

As will be described in detail hereinbelow with reference to the FIGS. 3, 4 and 5, the supporting arm 23 can be rotated about the kappa axis 24 by means of a kappa motor 28 mounted against one side of the base member 21. The goniometer head 25 can similarly be rotated about its phi axis 26 by means of a phi motor 29 mounted against the lower side of the base portion 22. The motors 28 and 29 are preferably also of the electric step motor type.

When the supporting arm 23 is rotated about the kappa axis 24, the phi axis 26 describes the surface of a cone having its apex in the center of the crystal 27. If it is desired to maintain the phi axis in the same selected chi plane (FIG. 1) when adjusting the supporting arm 23, it is necessary to adjust the omega disc 17 by means of the omega motor 19 simultaneously with the rotation of the arm 23 by the kappa motor 28. If it is further desired to maintain a selected phi angular position of the crystal in this chi plane, it is then necessary to rotate the goniometer head 25 about the phi axis 26 by means of the phi motor 29. The relationships between these respective rotational movements about the axes 24, 11 and 26 have been given hereinbefore.

As follows with reference to the drawings, by rotating the supporting arm 23 about the kappa axis 24 the goniometer head 25 may be moved through the quadrants III and IV of FIG. 1. The motors 18, 19, 28 and 29 can be controlled by a computer which is directly connected to the apparatus in a known manner. By suitably programming this computer it is possible to effect that an adjustment of the supporting arm 23 about the kappa axis 24 is accompanied by a correlated movement about the omega axis and phi axis whereby the phi axis remains in the same selected chi plane and the crystal remains in the same angular position in this chi plane, as above discussed. If desired, the several motors can be provided with means for visually reading the angular positions of the associated axes.

As indicated in the foregoing description, the goniostat 20 with base member 21, motors 28, 29 and supporting arm 23 is situated as a whole below a horizontal plane extending through the center of the apparatus. Thereby not only a very compact structure of great stability is obtained but also the chances of collision with the other parts of the diffractometer and of interception of the incident and the reflected beams are reduced to a minimum. It follows from the drawing that a rotation of the omega disc 17 through 360° is possible except in those kappa angular positions of the supporting arm 23 in which the path of the goniometer head 25 would intersect the collimator 16 extending far radially inwardly. The goniometer head which is of standard design, casts a given shadow cone having its apex in the center of the crystal 27 and its surface circumferentially enclosing the goniometer head. The outer end 30 of the supporting arm 23 has a reduced width and is so rounded that this arm end falls within this shadow cone. This means that the supporting arm 23 does not cause a widening of the shadow cone cast by the goniometer head and its mounting so as to extend the measuring range the greatest possible value.

Referring to FIG. 2, it is noted that the goniometer head is freely accessible from all sides whereby the mounting and the adjustment of the crystal in this head is facilitated. Also the mounting of the usually provided ray interceptor (not shown) for the nondeflected primary rays and of the usually provided microscope (not shown) for examining the crystal is greatly facilitated by the novel arrangement. The space above the central portion of the disc 17 is completely free whereby this disc and the 2-theta disc 10 may be provided with a central bore 31 for the passage of auxiliary apparatus, for instance for cooling or heating the crystal.

Figure 3:
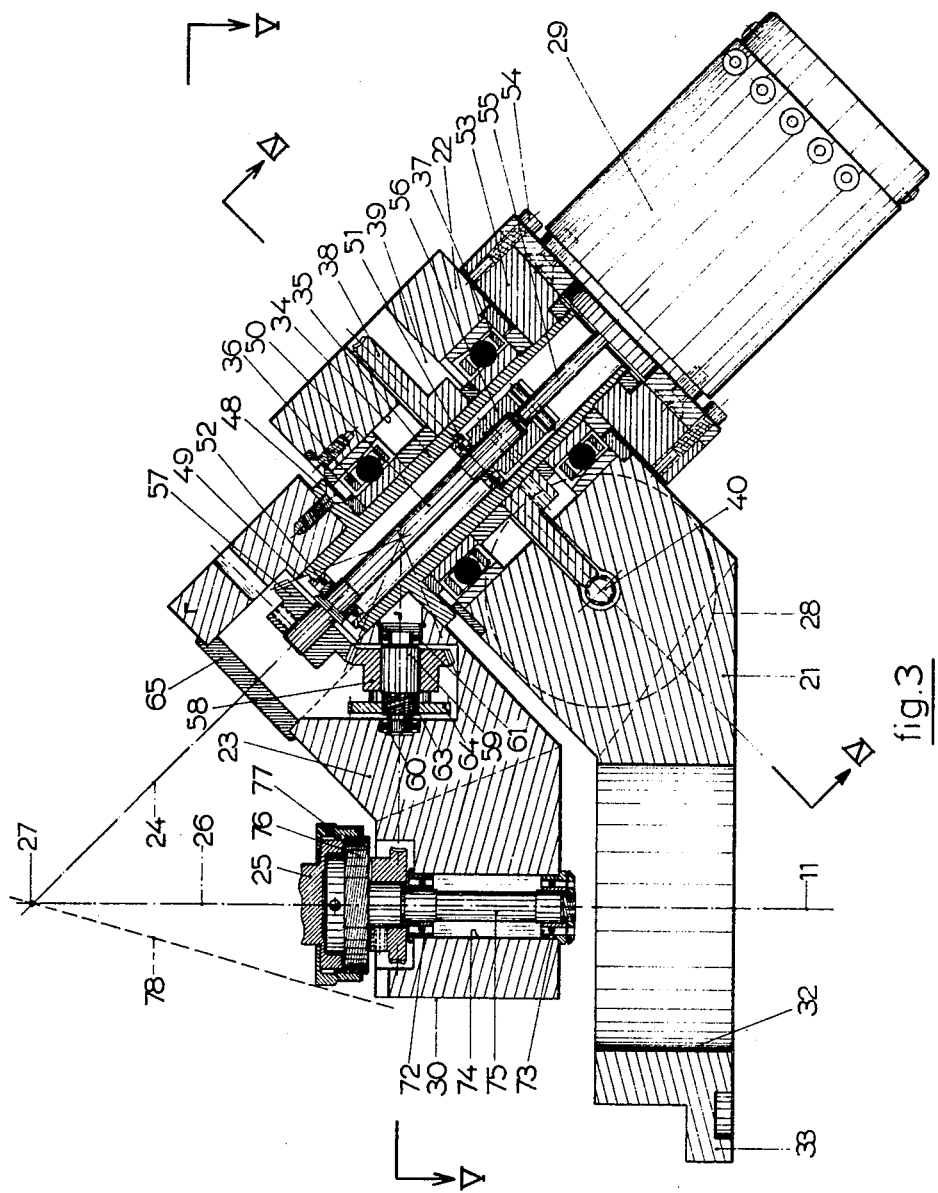
FIG. 3 is a sectional view, as seen from the vertical plane indicated by the line III—III of FIG. 4, of the goniostat of the diffractometer of FIG. 2.
Figure 4:
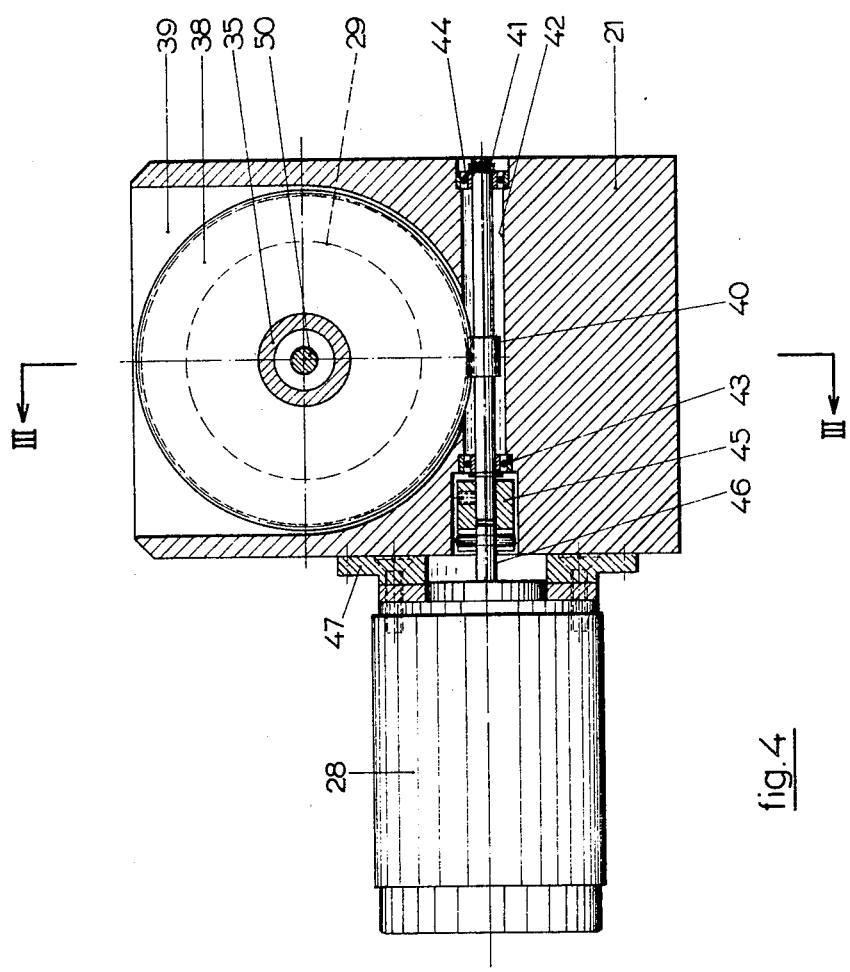
FIG. 4 is a sectional view as seen from the plane indicated by the line IV—IV of FIG. 3.
Figure 5:
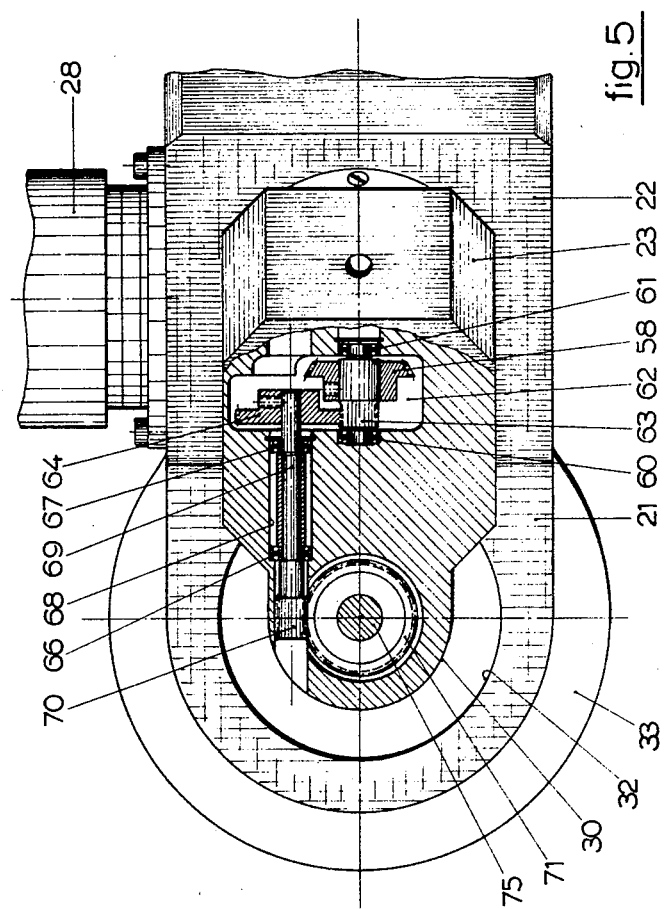
FIG. 5 is a sectional view as seen from the plane indicated by the V—V of FIG. 3.

In the FIGS. 3, 4 and 5 of the drawings the goniostat 20 is shown separately in a slightly modified form. The base member 21 extends here past the vertical axis 11 of the apparatus and is provided with a central bore 32 and a mounting flange portion 33 for mounting the goniostat on the supporting disc 17 of FIG. 2 with the bore 32 in alignment with the disc bore 31.

The inclined base portion 22 has a bore 34 in which a sleeve 35 is rotatably mounted by means of two ball bearings 36 and 37. A worm wheel 38 is secured to the sleeve 35 and is received in a slotlike recess 39 provided in the base portion 22. The worm wheel 38 is in engagement with a worm 40 on a wormshaft 41 rotatably mounted in a cross-bore 42 of the base member 21 by means of ball bearings 43 and 44. A coupling member 45 connects the wormshaft 41 to the shaft 46 of the kappa motor 28 which is mounted against one side of the base member 21 by means of a flanged support member 47 (FIG. 4).

The sleeve 35 has a flange portion 48 and the supporting arm 23 is secured against this flange portion by screws. The sleeve 35 extends past this flange portion and fits in a bore 49 in the arm 23. The axis of the sleeve 35 coincides with the kappa axis 24 and intersects the omega axis 11 in the point 27 at an angle of 45° which omega axis 11 coincides with the axis of the bore 32 in the base member.

A shaft 50 extends coaxially through the sleeve 35, the axis of this shaft thus coinciding with the kappa axis 24, which shaft 50 is rotatably but axially nonslidably mounted inside the sleeve 35 by means of ball bearings 51 and 52. The rear end of the sleeve 35 projects from the base portion 22 and carries a disc 53 fixedly secured thereto, the phi motor 29 being secured to this disc 53 by means of bolts 54. The shaft 55 of this motor 29 is connected to the shaft 50 by means of a coupling member 56.

The shaft 50 extends at its forward end past the forward end of the sleeve 35 and a bevel gear 57 is mounted on this shaft end portion so as to engage a bevel gear 58 of equal diameter. The bevel gear 58 is secured on a stud 59 mounted for rotation in a recess 62 of the arm 23 by means of ball bearings 60, 61. The stud 59 is provided with circumferential teeth 63 engaging a gearwheel 64 similarly arranged in the recess 62. This recess and the bore 49 communicating therewith are closed by a removable cover 65.

The gearwheel 64 is fixedly mounted on a wormshaft 69 provided with a worm 70 and rotatably mounted in a bore 68 of the arm 23 by means of ball bearings 66, 67 (FIG. 5). This worm 70 is in engagement with a worm wheel 71 fixedly mounted on a shaft 75 which is rotatably supported in a bore 74 of the arm 23 by means of ball bearings 72, 73. The axis of this shaft 75 coincides with the phi axis 26 and thus intersects the kappa axis 24 in the point 27 (the center of the crystal) at an angle of 45°. In the lowest angular position of the arm 23 (in which the angle $K=0$) shown in FIG. 3 the phi axis 26 coincides with the omega axis 11. The shaft 75 is provided at its inner end with an integral, circumferentially threaded supporting disc 76 for mounting the goniometer head 25 (only partly shown in FIG. 3) in the conventional manner by means of a union nut 77. As appears from FIG. 3, a cone described by a line 78 passing through the point 27 and tangential to the circumference of the union nut 77 forming the base of the goniometer head, does not intersect the reduced rounded end portion 30 of the cranked supporting arm 23 which means that this arm does not increase the normal loss of measuring range caused by the goniometer head structure itself.

As will be apparent from the foregoing description of the apparatus, the kappa motor 28 upon its operation drives the sleeve 35 through the worm gear transmission 40, 38 and thereby rotates the supporting arm 23 about the kappa axis 24. Upon a full rotation of the arm 23 the phi axis 26 describes a cone having an apex angle of 90°. Since the housing of the phi motor 29 is fixedly secured to the sleeve 35, this motor rotates with the sleeve and the arm 23 so that the bevel gears 57 and 58 remain stationary with respect to each other and the shaft 75 remains stationary with respect to the arm 23. On the other hand, by operating the phi motor 29 the shaft 75 is driven through these bevel gears 57, 58 and the worm gear transmission 70, 71 whereby the goniometer head 25 is rotated about the phi axis 26 without the angular position of the arm 23 about the kappa axis 24 being changed thereby. The sleeve 35 and the shaft 75 both can be turned through a full circle.

It would also be possible to mount the phi motor 29, like the kappa motor 28, against a side face of the goniostat base member 21 in a position, in which the shafts of these two motors run parallel. In that case an additional angular transmission between the phi motor shaft and the shaft 50 is required. In order to prevent a relative rotation of the shaft 75 when the arm 23 is rotated it is further required in this embodiment to rotatably mount the housing of the phi motor 29 and to connect this motor housing with the sleeve 35 through a bevel gear transmission in such a way that this motor housing rotates with the sleeve 35. Such an embodiment is mechanically more complicated but has the advantage in that more space is available for the provision of an electrical or mechanical device for reading the angular position of the phi motor shaft. Also, the reading devices for this shaft and for the kappa motor shaft can be conveniently arranged beside one another. Reading devices of this type are well known in the art and have, therefore, not been shown in the drawings. The several setting motors 18, 19, 21 and 28 need not be electric step motors but may be also direct current motors or synchronous motors. Preferably the setting motors should be of the type permitting a positioning speed of 4°/sec. As discussed hereinbefore the setting motors may be directly controlled by a computer (not shown).

Within the scope of the invention various changes in the described embodiment may be resorted to. The angles between the kappa axis and the omega axis and between the kappa axis and the phi axis may be greater than 45° and a value of 50° may be preferable in many cases. Angles of greater than 60° are generally not practical since in that case a decrease of the measuring range could occur in response to the interception of the incident or reflected beam of rays by the supporting arm 23 in certain angular positions of the omega axis.

What is claimed is:

1. A goniometric apparatus comprising a mounting member, a supporting member, means for mounting said supporting member on said mounting member for rotation about a first axis, the omega axis, omega drive means coupled to said supporting member for rotation thereof about said omega axis, a goniostat mounted on said supporting member for rotation therewith, said goniostat including a base member secured to said goniostat supporting member and having a portion extending radially outwardly with respect to said omega axis, a supporting arm having an outer end portion and an inner end portion, bearing means arranged at said outwardly extending base member portion and defining an axis of rotation, the kappa axis, intersecting said omega axis at an acute angle in a fixed point of intersection, said bearing means rotatably supporting said supporting arm at its said inner end portion for rotation of said arm about said kappa axis, a goniometer head having a central axis, the phi axis, and means for mounting said goniometer head on said supporting arm outer end portion in a position in which said phi axis intersects said omega axis and said kappa axis in said fixed point of intersection, and kappa drive means for rotating said supporting arm about said kappa axis and phi drive means for rotating said goniometer head about said phi axis.

2. The apparatus of claim 1, in which said angle between said kappa axis and said omega axis is equal to the angle between said kappa axis and said phi axis.

3. The apparatus of claim 2 in which said angles are in the range of 45°–60°.

4. The apparatus of claim 1 in which said goniostat and said goniometer supporting arm each have a rotational range of at least 360° about said omega axis and said kappa axis, respectively.

5. The apparatus of claim 1, in which said goniostat further comprises a sleeve member mounted for rotation in said base member and extending upwardly and radially inwardly from said base member in an inclined position with its axis coinciding with said kappa axis, said goniometer head supporting arm being mounted on the upper end of said sleeve member, said kappa drive means being mounted on said base member and coupled to said sleeve member for rotation of the latter, a shaft extending through said sleeve member coaxially therewith and mounted for independent rotation with respect to said sleeve member, means rotatably mounting said goniometer head for rotation about said phi axis in the outer end portion of said supporting arm, transmission means arranged inside said supporting arm and coupling the upper end of said shaft with said goniometer head, and phi drive means coupled to said shaft for rotating the latter and thereby through said transmission means rotating said goniometer head about said phi axis.

6. The apparatus of claim 5, in which said kappa drive means for rotating said goniometer head supporting arm is mounted against one side face of said goniostat base member, said kappa drive means driving said sleeve member through a reduction gearing arranged in said base member.

7. The apparatus of claim 5, in which said phi drive means is supported by the lower end of said sleeve member opposite from said upper sleeve end carrying said supporting arm, said phi drive means being positioned in alignment with said shaft passing through said sleeve member whereby said phi drive means as a whole rotates together with said sleeve member.

8. The apparatus of claim 1, in which said goniostat supporting member rotatable about the omega axis includes a central bore along said omega axis for the passage of auxiliary apparatus.

9. The apparatus of claim 1, in which said goniometer head has a substantial circular outer circumference defining together with said common point of intersection an imaginary cone coaxial with said phi axis, having its apex in said point of intersection and its generating line tangential to said goniometer head outer circumference, said outer end portion of said supporting arm terminating within said imaginary cone.

10. The goniometric apparatus of claim 1, in combination with a system for controlling said goniometric apparatus in which said system comprises means for controlling said omega drive means and said phi drive means in such correlation with said kappa drive means that an adjustment of the supporting arm angular position about said kappa axis by means of said kappa drive means is accompanied by a simultaneous adjustment of the goniometer angular position about said omega axis and of the goniometer head angular position about said phi axis tending to maintain said phi axis in the same plane and to maintain the goniometer head in the same angular position with respect to said latter plane, respectively.

11. In a diffractometer having a mounting member, a supporting member member, means for mounting said supporting member on said mounting member for rotation about a first axis, the omega axis, and omega drive means coupled to said supporting member for rotation thereof about said omega axis, a goniostat mounted on said supporting member for rotation therewith, said goniostat including a base member secured to said goniostat supporting member and having a portion extending radially outwardly with respect to said omega axis, a supporting arm having an outer end portion and an inner end portion, bearing means arranged at said outwardly extending base member portion and defining an axis of rotation, the kappa axis, intersecting said omega axis at an acute angle in a fixed point of intersection, said bearing means rotatably supporting said supporting arm at its said inner end portion for rotation of said arm about said kappa axis, a goniometer head having a central axis, the phi axis, and means for mounting said goniometer head on said supporting arm outer end portion for rotation about said phi axis in a position in which said phi axis intersects said omega axis and said kappa axis in said fixed point of intersection, and kappa drive means for rotating said supporting arm about said kappa axis, and phi drive means for rotating said goniometer head about said phi axis.

12. The arrangement of claim 11 in which the angle between said kappa axis and said omega axis is equal to the angle between said kappa axis and said phi axis, said angle being in the range of 45°–60°.